(12) United States Patent
Fuller

(10) Patent No.: US 7,695,242 B2
(45) Date of Patent: Apr. 13, 2010

(54) WIND TURBINE FOR GENERATION OF ELECTRIC POWER

(76) Inventor: Howard J. Fuller, 880 Clark La., Fallon, NV (US) 89406

( * ) Notice: Subject to any disclaimer, the term of this patent is extended or adjusted under 35 U.S.C. 154(b) by 555 days.

(21) Appl. No.: 11/566,790

(22) Filed: Dec. 5, 2006

(65) Prior Publication Data

US 2008/0131273 A1    Jun. 5, 2008

(51) Int. Cl.
*F03D 3/06* (2006.01)
(52) U.S. Cl. .................. 415/2.1; 415/4.1; 415/90; 415/203; 415/204; 416/185; 416/186 R; 416/200 A; 416/223 B; 416/243
(58) Field of Classification Search .................. 415/2.1, 415/4.1, 90, 203, 204; 416/185, 186 R, 200 A, 416/223 B, 243
See application file for complete search history.

(56) References Cited

U.S. PATENT DOCUMENTS

| | | | |
|---|---|---|---|
| 699,636 A | 5/1902 | Thrupp | |
| 963,277 A * | 7/1910 | Clifford | 415/198.1 |
| 1,013,248 A * | 1/1912 | Wilkinson | 415/90 |
| 1,061,142 A | 5/1913 | Tesla | |
| 1,061,206 A * | 5/1913 | Tesla | 415/90 |
| 1,323,542 A | 12/1919 | Naylor | |
| 1,383,937 A | 7/1921 | Guthrie | |
| 1,402,053 A | 1/1922 | Dake | |
| 1,429,570 A | 9/1922 | Dake | |
| 1,489,930 A * | 4/1924 | Clary | 415/60 |
| 2,036,018 A | 3/1936 | Caldwell | |
| 2,640,678 A | 6/1953 | Andresen | |
| 3,404,867 A | 10/1968 | Williams | |
| 3,923,416 A | 12/1975 | Frey | |
| 4,025,225 A | 5/1977 | Durant | |
| 4,140,433 A | 2/1979 | Eckel | |
| 4,253,798 A * | 3/1981 | Sugiura | 415/98 |
| 4,319,141 A * | 3/1982 | Schmugge | 290/52 |
| 4,390,316 A * | 6/1983 | Alison | 415/76 |
| 4,531,890 A * | 7/1985 | Stokes | 416/187 |
| 4,545,726 A | 10/1985 | Holliger | |
| 5,088,892 A | 2/1992 | Weingold et al. | |
| 5,186,604 A * | 2/1993 | Iorio et al. | 415/90 |
| 6,210,116 B1 * | 4/2001 | Kuczaj et al. | 416/185 |
| 6,239,506 B1 | 5/2001 | Roskey | |
| 6,375,412 B1 | 4/2002 | Dial | |
| 6,632,071 B2 * | 10/2003 | Pauly | 416/185 |
| 6,692,232 B1 | 2/2004 | Letourneau | |
| 6,726,442 B2 | 4/2004 | Letourneau | |
| 6,779,964 B2 | 8/2004 | Dial | |
| 6,786,697 B2 | 9/2004 | O'Connor | |
| 6,866,477 B2 | 3/2005 | Arness | |
| 6,870,280 B2 | 3/2005 | Pechler | |
| 6,887,041 B2 | 5/2005 | Coke | |
| 7,062,900 B1 * | 6/2006 | Brun | 60/39.35 |
| 2003/0053909 A1 | 3/2003 | O'Hearen | |

* cited by examiner

*Primary Examiner*—Igor Kershteyn
(74) *Attorney, Agent, or Firm*—William H. Eilberg

(57) ABSTRACT

A turbine includes a stack of substantially parallel disks, the rotation of which causes rotation of a shaft. The disks are separated by peripheral spacers, each peripheral spacer having the shape of an airfoil. Each peripheral spacer defines a chord which is angled radially inward, towards the axis of rotation of the disk. The peripheral spacers are located only in the vicinity of the periphery of the disk. Air, or other fluid, entering the turbine engages the airfoil shaped peripheral spacers, and the flow of air generates lift, and associated drag, causing the energy of the fluid to be more efficiently converted into mechanical, and ultimately, electrical power. The turbine is especially useful in harnessing wind energy for the generation of electric power.

19 Claims, 4 Drawing Sheets

WIND TURBINE FOR GENERATION OF ELECTRIC POWER

BACKGROUND OF THE INVENTION

The present invention relates to the field of wind energy, and provides a turbine which efficiently converts wind energy into mechanical power. The turbine can also be driven by fluids other than wind.

The invention is an improvement to a Tesla turbine. Tesla turbines were first patented by Nikola Tesla in 1913, as exemplified by U.S. Pat. Nos. 1,061,142 and 1,061,206, the disclosures of which are incorporated by reference herein. In brief, a Tesla turbine includes a plurality of spaced-apart disks, where a fluid flows in the spaces between the disks, in a generally spiral path.

An improvement to the Tesla turbine was disclosed in U.S. Patent Application Publication No. US 2003/0053909, the disclosure of which is also incorporated by reference. The cited publication discloses a modified Tesla turbine in which the disks are separated by airfoil-shaped members disposed between the disks. The turbine in the cited publication is intended for use in a turbine engine, such as in an aircraft.

The present invention provides a further improvement over the basic concept of a Tesla turbine. The turbine of the present invention is particularly useful as a wind turbine or the like, and provides maximum efficiency in converting wind energy to mechanical power. It can also be used in geothermal applications, in which a refrigerant fluid, flowing in a closed loop, is used to drive the turbine.

SUMMARY OF THE INVENTION

The turbine of the present invention is a Tesla turbine, defined by a stack of substantially parallel disks. The stack is arranged to receive fluid, such as air, from an inlet conduit, and to discharge fluid through an outlet conduit. The disks are connected to spokes which provide a means for connection of the disks to a shaft disposed along the axis of the stack, wherein rotation of the disks causes rotation of the shaft. The spokes also serve as central spacers located near the hub of each disk.

The disks of the stack are held in a spaced-apart arrangement by a set of peripheral spacers, each of the peripheral spacers extending from one disk to the next. Each peripheral spacer has an enlarged, continuously curved leading edge, and a relatively thin trailing edge. Thus, each peripheral spacer has the shape of an airfoil. The airfoil defines a chord which extends radially inward, towards the axis of rotation of the disk. The airfoil shaped peripheral spacers are located only in the vicinity of the periphery of the disks. In the preferred embodiment, the peripheral spacers are positioned such that the distance between the innermost portion of any of the peripheral spacers and the center of the disk is at least about 0.95 times the radius of the disk.

The number of peripheral spacers is preferably at least three. In the most preferred embodiments, the peripheral spacers are separated from each other by approximately one-half the radius of the disk.

In a preferred arrangement, the peripheral spacers are aligned so as to define columns of such peripheral spacers extending through the entire turbine. But it is also possible to arrange the peripheral spacers in other patterns, or randomly, without any particular alignment.

Air entering the turbine flows over the airfoil shaped peripheral spacers, and the lift produced thereby enhances the efficiency of the turbine. As a result of air flowing over these airfoil shaped peripheral spacers, the turbine generates more mechanical power, for a given flow of air, than would be produced by a prior art turbine. The turbine of the present invention is especially suitable for use in wind or geothermal power plants, but it can also be used in other applications.

For the case in which the turbine is used in wind-driven power plants, the turbine can be mounted within a housing having an elongated, outlet channel having at least one flat surface. The elongated outlet channel thus comprises a weather vane, so as to align the apparatus automatically relative to the wind.

The turbine of the present invention can be housed within a container having vanes or louvers for regulating the flow of fluid into the turbine.

The present invention therefore has the primary object of providing a turbine having improved efficiency.

The invention has the further object of employing aerodynamic principles to enhance the efficiency of a wind turbine.

The invention has the further object of making it more practical to produce electricity using wind or geothermal power.

The invention has the further object of providing a Tesla turbine having improved operation.

The invention has the further object of providing a turbine which operates efficiently over a wide range of fluid flow rates, and which therefore is suitable for use where the incoming fluid flow varies randomly.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
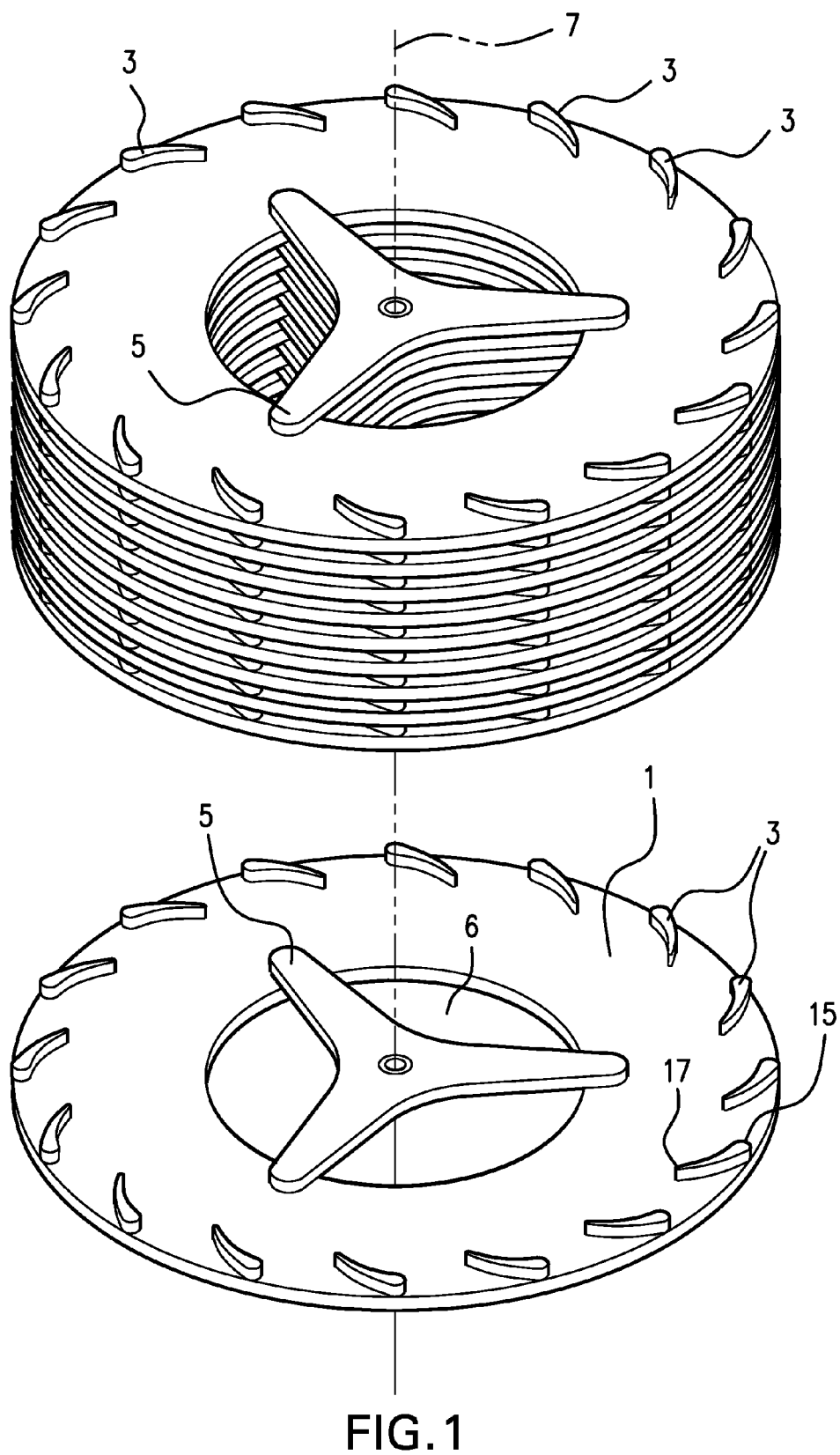
FIG. 1 provides a perspective view, partly in ellipsis, showing the stack of disks defining the essential component of the turbine of the present invention.

The essential component of the turbine of the present invention comprises a plurality of spaced-apart disks. FIG. 1 shows a stack of such disks, the figure being drawn in ellipsis, to show part of the assembled stack, and also showing one disk 1 in isolation.

The disks are held in a spaced-apart arrangement by peripheral spacers 3, disposed along the periphery of the disks, and also by spokes 5. The spokes comprise central spacers because they provide support for the stack near its hub, near the centers of the disks. The spokes 5 span vent openings 6, the vent openings providing a path for fluid to exit the turbine. The spokes also comprise means for connecting the disks to a shaft, the shaft being symbolized by, and coincident with, central axis 7 in FIG. 1. Movement of the spokes, under the influence of pressure from incoming fluid, causes the disks to rotate, and to impart motion to the shaft. The shaft can be connected to appropriate means (not shown) for performing mechanical work, such as operating an electric generator.

The spokes and peripheral spacers extend, respectively, the entire distance from one disk to the next. The stack is delimited by end disks 2 and 4, shown in FIG. 3, and no spacers are needed on the outsides of these end disks.

Figure 2:
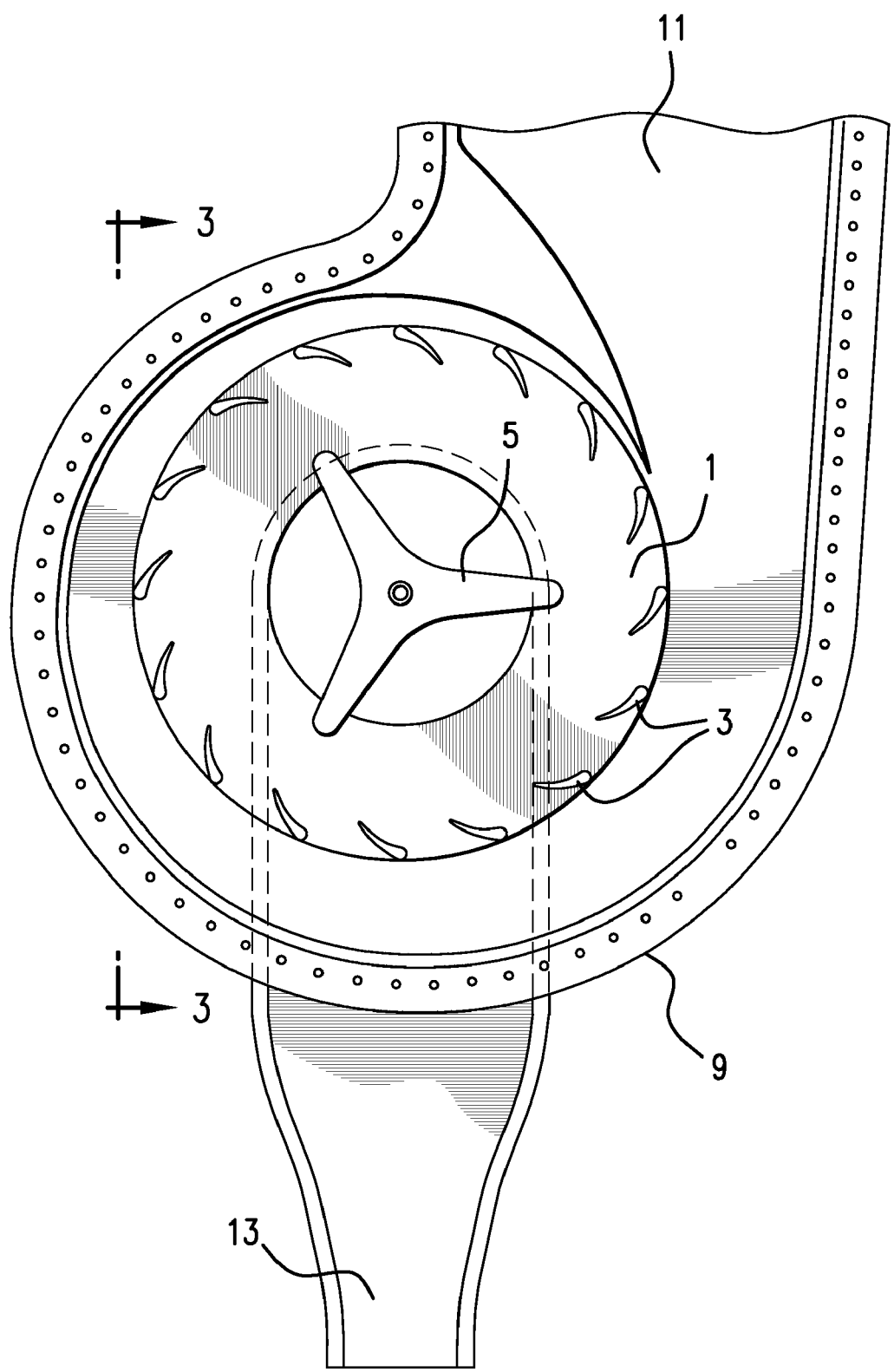
FIG. 2 provides a cross-sectional view of the complete turbine of the present invention, including the inlet ducts and outlet ducts for carrying fluid towards and away from the turbine.
Figure 3:
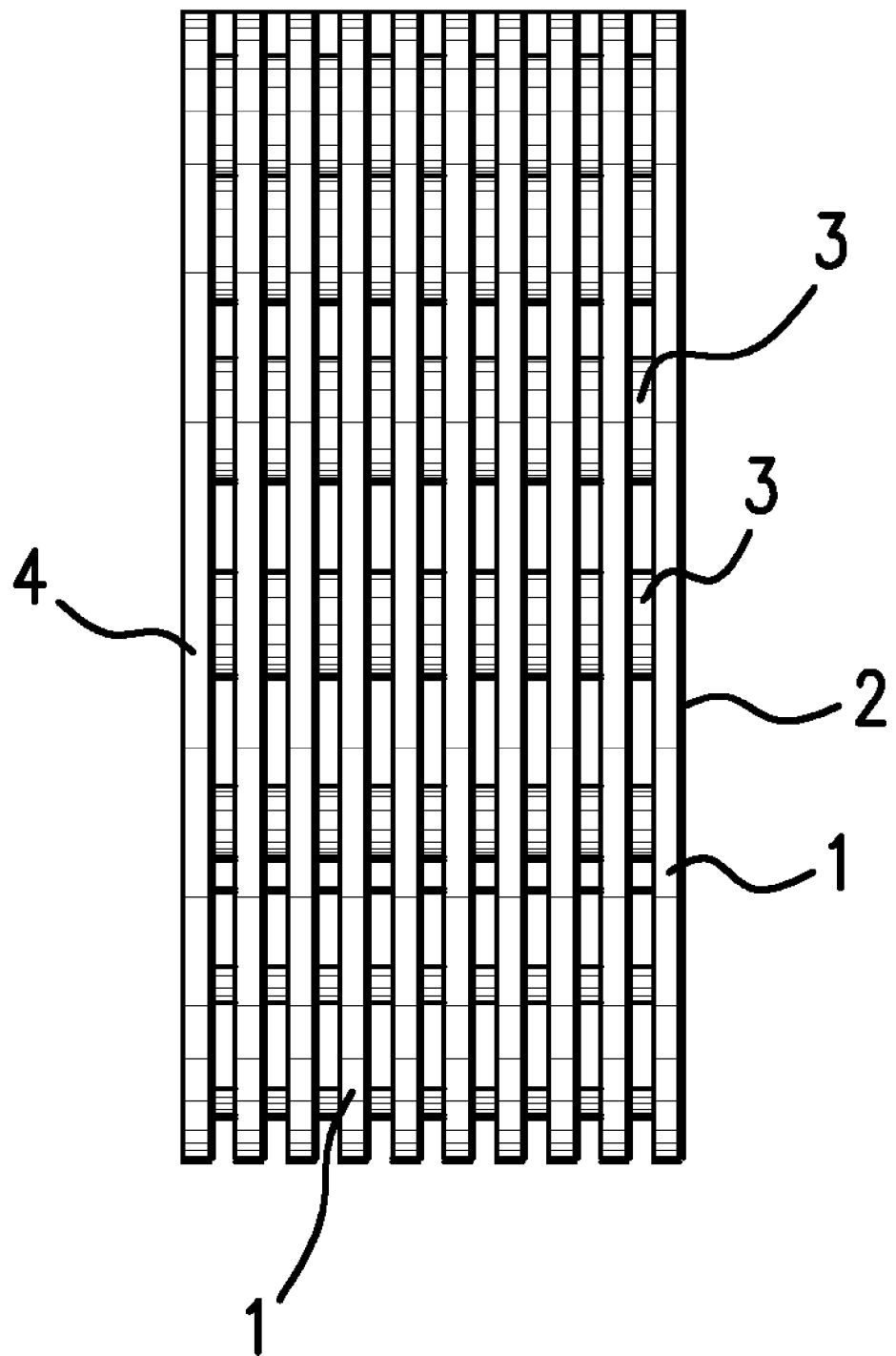
FIG. 3 provides a cross-sectional view of the turbine of the present invention, taken along the line 3-3 of FIG. 2.

FIG. 2 shows one of the disks installed in a complete turbine, and FIG. 3 provides a cross-sectional view taken along the line 3-3 of FIG. 2. FIG. 2 shows disk 1, with peripheral spacers 3 and spokes 5, held within housing 9. The housing defines an inlet channel 11 and is connected to outlet channel 13. The cross-sectional view of FIG. 3 shows the positions of the various disks 1 separated by the peripheral spacers 3.

As shown in FIGS. 1 and 2, each of the peripheral spacers 3 has the shape of an airfoil. That is, as can be seen clearly from FIG. 1, for example, each peripheral spacer 3 has an enlarged leading edge 15, and a thin trailing edge 17. The exact shape of the peripheral spacer can be varied, but in the preferred embodiment, the leading edge is wider than the trailing edge, as illustrated. Also, each peripheral spacer is continuously curved, from the leading edge to the trailing edge. The leading edge itself is generally smooth and continuous, as shown. Thus, each peripheral spacer comprises an airfoil, similar to a wing of an aircraft.

Each airfoil shaped peripheral spacer defines a chord which comprises a line drawn from its leading edge to the trailing edge. As is shown in FIGS. 1 and 2, the chord of each airfoil shaped peripheral spacer is angled slightly inward, towards the axis of rotation of the turbine.

In the preferred embodiment, the peripheral spacers 3 are located only along, or in the vicinity of, the periphery of the disks, and do not occupy the majority of the area of the disk. More specifically, if the radius of the disk is denoted by R, it is preferred that the innermost portion of the trailing edge of the spacer be positioned at a distance which is at least about 0.95 R from the center of the disk. That is, the distance between any point on one of the peripheral spacers, and the center of the disk, is greater than or equal to about 0.95 R. While the latter feature is the preferred construction, it should not be deemed to limit the invention. It is still possible to provide peripheral spacers which are somewhat closer to the center of the disk than 0.95 R.

Also, the peripheral spacers are preferably spaced from each other such that the distance between adjacent peripheral spacers is approximately one-half the radius of the disk. This spacing can be varied somewhat, according to the number of peripheral spacers used.

The minimum number of peripheral spacers, in the preferred embodiment, is three, but there is no maximum number, subject to limitations of space, and subject to the spacing recommendation given above.

The purpose of the peripheral spacers is to impart inward momentum to the fluid, such as air, entering the turbine. Through the development of lift, from fluid flow along the peripheral spacers, and through development of concomitant induced drag, the incoming fluid more efficiently imparts motion to the disks. The use of the described airfoil-shaped peripheral spacers minimizes turbulence and profile drag, while retaining the boundary layer effect of the closely-spaced adjacent disks. The present arrangement therefore differs from structures of the prior art, insofar as it does not employ large airfoil sections, occupying substantially the entire radius of the disks, and thus allows the surface area of the disks to continue to be used for boundary layer effects.

The effect of the structure described above is to impart energy, more efficiently, than is possible with prior art turbines. This feature is especially important where the disks are rotating under the influence of wind power, and are not rotated by an artificially generated gas stream such as the stream in a turbine engine.

In the stack of disks shown in FIG. 1, the peripheral spacers are aligned throughout the stack. The peripheral spacers thus define a column which extends through substantially the entire stack of disks. Such alignment is not absolutely necessary, but it is desirable because the alignment helps maintain the structural integrity of the entire stack.

Figures 4, 5:
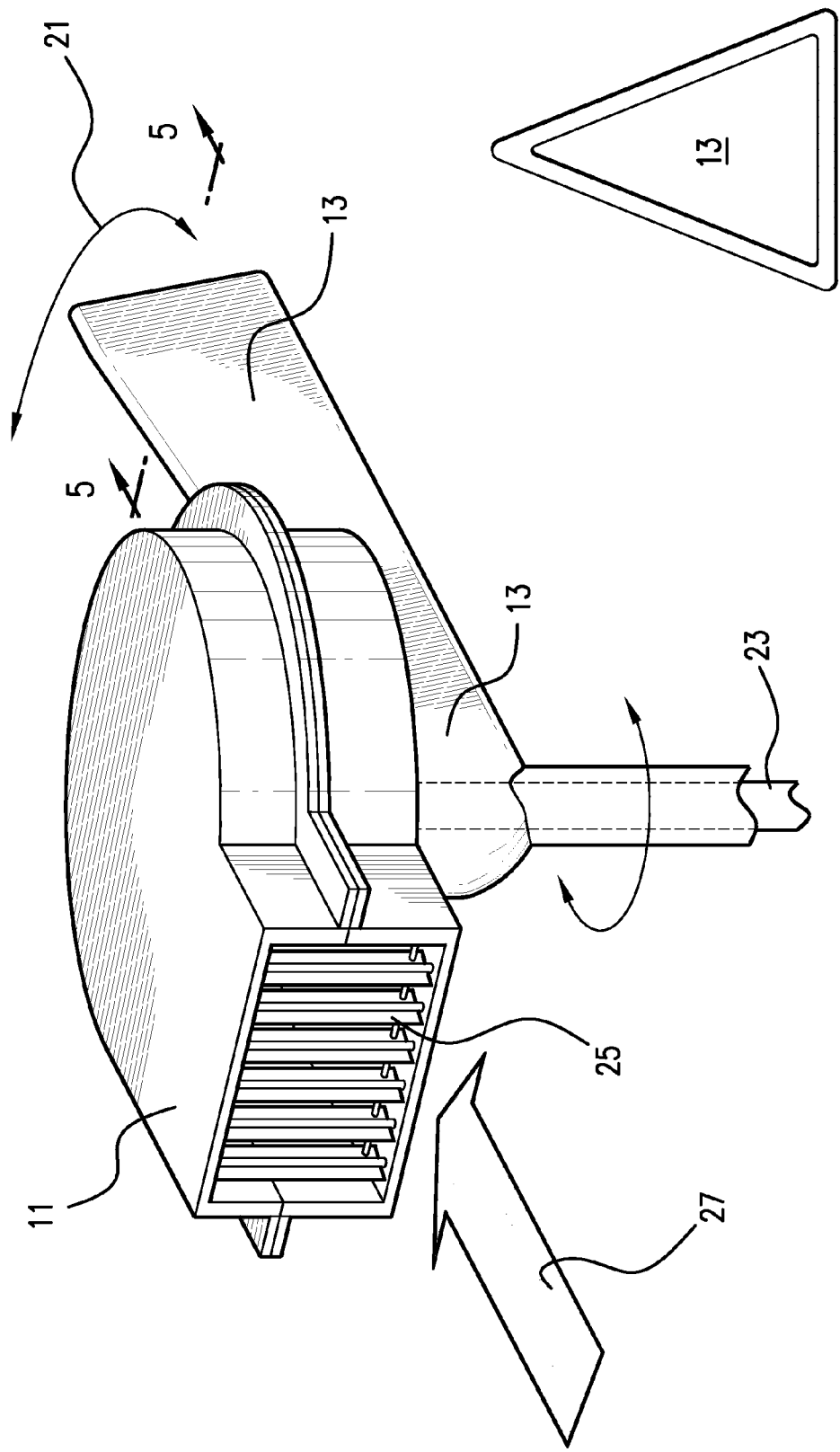
FIG. 4 provides a perspective view of an alternative embodiment of the turbine of the present invention, wherein the outlet conduit of the turbine is elongated to define a weather vane, and wherein the turbine is disposed in a housing having louvers for controlling the flow of fluid into the turbine.
FIG. 5 provides a cross-sectional view, taken along the line 5-5 of FIG. 4.

FIGS. 4 and 5 illustrate additional variations which can be included in the turbine of the present invention. As shown in FIG. 4, the turbine is contained in a housing which defines inlet channel 11. The outlet channel 13, also defined by the housing, is elongated, as compared with what is shown in FIG. 2. The outlet channel thus functions as a tail that aerodynamically and automatically aligns the inlet into the relative wind. Such alignment maximizes the efficiency of the turbine. The entire turbine thus rotates under the influence of the wind, as indicated by arrow 21. The manner of connection of the disks of the turbine and the drive shaft 23, not visible in the view of FIG. 4, is the same as shown in the above-described embodiment.

When the outlet channel is used as a tail or weather vane, it is preferred that the channel have at least one generally flat surface, to enhance its performance as a weather vane. In the embodiment shown in FIGS. 4 and 5, the channel has a generally triangular cross-section, as indicated in FIG. 5. Thus, in the arrangement shown, the outlet channel has three generally flat sides. This cross-section can be varied; instead of a triangle, one could use various modified rectangular structures, or other shapes. It is preferred that the outlet channel have at least one generally flat side.

FIG. 4 also shows a plurality of vanes or louvers 25, which comprise means for controlling the flow of air into the turbine. The incoming air flows in the direction indicated by arrow 27. The setting of the vanes or louvers 25 thus controls the speed of the turbine, by varying the effective size of the inlet opening, and thus controlling the mass flow of fluid through the turbine. In particular, since the voltage produced by a generator will be related to the speed of rotation of the shaft, the setting of the louvers effectively controls the voltage produced by the turbine.

When the turbine of the present invention is used to generate power from wind, the turbine can be mounted on a pole or tower sufficiently high to clear any local obstacles to the natural wind flow. However, when the embodiment of FIG. 4 is used, the tower can typically be shorter than that used by conventional horizontal axis wind turbines because the turbine blades are all contained within a housing. Thus, there are no external blades that require additional ground clearance. The present invention therefore has the additional benefit of providing a completely enclosed turbine which can be screened to prevent injury to birds, and to prevent interference with nearby defense surveillance radar facilities. Proper construction materials and techniques will enable this turbine to achieve near transparency to radar microwave emissions.

The turbine of the present invention can also be used in geothermal applications. In a geothermal power generation system, the temperature differential between a geothermal source and ambient air is used to heat and cool a fluid medium, such as a refrigerant fluid, in a closed loop. At one stage in the process, the fluid medium is made to pass through a turbine to produce power. The present invention is particularly useful where the geothermal source does not have enough heat to produce the superheated steam needed to drive a conventional steam turbine. In other words, the efficiency of the present turbine enables it to work even where the geothermal source is relatively cool.

The turbine of the present invention has the advantage that it is efficient over a wider range of fluid flow rates, as compared with turbines of the prior art, due to the airfoil-shaped spacers. This feature makes the present turbine especially useful for generating power from wind, which is inherently random and variable. It also makes the turbine useful for generating power from relatively low-temperature geothermal sources, as mentioned above.

The features illustrated in FIG. 4, namely the use of the extended outlet as a weather vane, and the use of louvers to control air flow into the turbine, can be provided together or separately. That is, it is possible to provide the turbine of the present invention with inlet louvers, but without an elongated outlet, or with an elongated outlet and without the inlet louvers. Thus, either or both or neither of these features can be provided in the turbine of the present invention.

The invention can be modified in various ways. The exact shape of the peripheral spacers, and their positions can be varied, as has been explained above. The vanes or louvers, used to control the flow of fluid into the turbine, could be replaced by equivalent structures. Such modifications, and others which will be apparent to those skilled in the art, should be considered within the spirit and scope of the following claims.

What is claimed is:

1. In a turbine having a plurality of substantially parallel disks, the disks being held in spaced-apart relation by a plurality of peripheral spacers having an airfoil shape including an enlarged leading edge and a thin trailing edge, each of the peripheral spacers being continuously curved from the leading edge to the trailing edge, the leading edge being generally smooth and continuous, the turbine including an inlet for directing fluid towards the disks and an outlet for directing fluid away from the disks, the disks being connected to means for engaging a shaft, the improvement wherein the peripheral spacers are disposed only in a vicinity of a periphery of the disks, wherein the leading edges of the spacers are located closer to the periphery than the trailing edges, and wherein each disk has a central opening, wherein the central openings of the disks together define a path for fluid to exit the turbine.

2. The improvement of claim 1, wherein each of the disks has a radius denoted by R, and wherein the peripheral spacers are located a distance of at least about 0.95 R from a center of the disk.

3. The improvement of claim 1, wherein the peripheral spacers are spaced apart from each other by approximately one-half the radius of the disk.

4. The improvement of claim 1, wherein there are at least three peripheral spacers.

5. The improvement of claim 1, wherein each disk is connected to a set of spokes, the spokes defining a central spacer located near a hub of the disk.

6. The improvement of claim 1, wherein the peripheral spacers are aligned so as to define a column of peripheral spacers extending through the turbine.

7. The improvement of claim 1, wherein the disks define an axis of rotation, wherein each peripheral spacer has a chord extending from the leading edge to the trailing edge, and wherein the chord of each peripheral spacer is angled slightly inward, towards the axis of rotation.

8. The improvement of claim 1, wherein the outlet comprises an elongated structure having a generally flat surface.

9. The improvement of claim 1, further comprising a plurality of louvers, disposed in a vicinity of the inlet, for controlling a flow of fluid into the turbine.

10. A turbine for converting energy of a moving fluid into mechanical power, comprising:
    a) a stack of substantially parallel disks, the disks being held in spaced-apart relation by a plurality of peripheral spacers, the disks being connected to means for engaging a shaft,
    b) an inlet conduit for conveying fluid towards the stack, and
    c) an outlet conduit for conveying fluid away from the stack,
    d) wherein each of the peripheral spacers has a leading edge and a trailing edge, the leading edge having a thickness greater than a thickness of the trailing edged,
    wherein each of the peripheral spacers is continuously curved from the leading edge to the trailing edge, the leading edge being generally smooth and continuous,
    wherein the leading edges of the spacers are positioned closer to a periphery of the disks than the trailing edges, and
    wherein each disk has a central opening, wherein the central openings of the disks together define a path for fluid to exit the turbine.

11. The turbine of claim 10, wherein the disks define an axis of rotation, wherein each peripheral spacer defines a chord extending from the leading edge to the trailing edge, and wherein the chord of each peripheral spacer is angled slightly inward, towards the axis of rotation.

12. The turbine of claim 11, wherein the peripheral spacers are located only in a vicinity of a periphery of the disks.

13. The turbine of claim 12, wherein each of the disks has a radius denoted by R, and wherein the peripheral spacers are located a distance of at least about 0.95 R from a center of the disk.

14. The turbine of claim 10, wherein the outlet conduit comprises an elongated structure having a generally flat surface.

15. The turbine of claim 10, further comprising a plurality of louvers, disposed in a vicinity of the inlet conduit, for controlling a flow of fluid into the turbine.

16. A turbine for converting energy of a moving fluid into mechanical power, comprising:
    a) a stack of substantially parallel disks, the disks being held in spaced-apart relation by a plurality of peripheral spacers, the disks being connected to means for engaging a shaft,
    b) an inlet conduit for conveying fluid towards the stack, and
    c) an outlet conduit for conveying fluid away from the stack,
    wherein:
    d) each of the peripheral spacers has a leading edge and a trailing edge, the leading edge having a thickness greater than a thickness of the trailing edge, wherein each of the peripheral spacers is continuously curved from the leading edge to the trailing edge, the leading edge being generally smooth and continuous, and wherein the leading edge of each spacer is positioned closer to a periphery of the disk than each trailing edge, e) the disks define an axis of rotation, wherein each peripheral spacer defines a chord extending from the leading edge to the trailing edge, and wherein the chord of each peripheral spacer is angled inward, towards the axis of rotation, f) wherein the peripheral spacers are located only in a vicinity of a periphery of the disks, and g) wherein each disk has a central opening, wherein the central openings of the disks together define a oath for fluid to exit the turbine.

17. The turbine of claim 16, wherein each of the disks has a radius denoted by R, and wherein the peripheral spacers are located at a distance of at least about 0.95 R from a center of the disk.

18. The turbine of claim 16, wherein the outlet conduit comprises an elongated structure having a generally flat surface.

19. The turbine of claim 16, further comprising means for controlling a flow of fluid into the turbine.

* * * * *